Patented Apr. 30, 1935

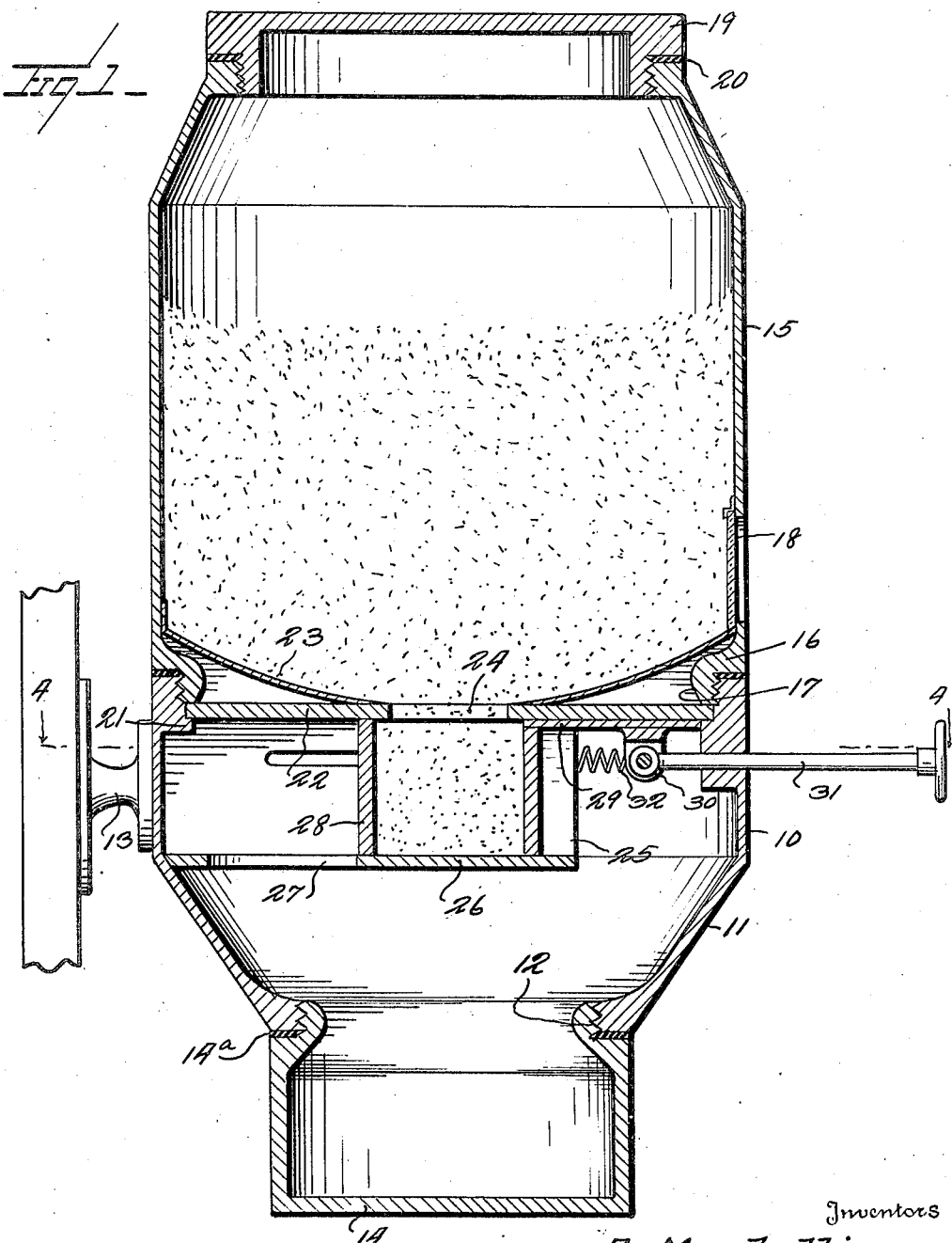

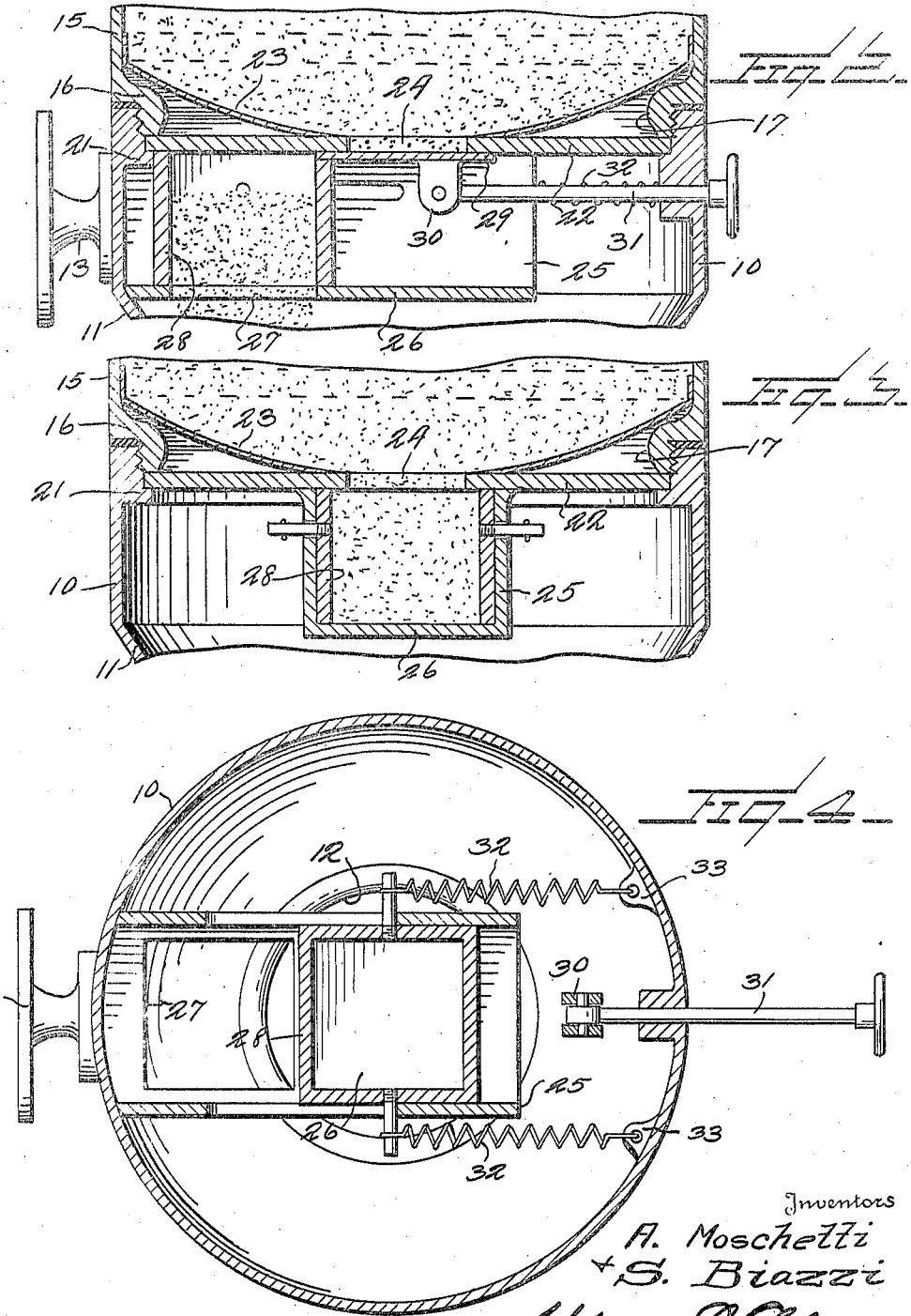

1,999,624

UNITED STATES PATENT OFFICE 1,999,624

COFFEE DISPENSER

Salvatore Biazzi and Alexander Moschetti, San Jose, Calif.

Application July 5, 1934, Serial No. 733,910

3 Claims. (Cl. 221—104)

This invention relates to dispensing devices and particularly to means for dispensing coffee, though we do not wish to be limited to this use of the structure.

The general object of the invention is to provide a dispensing device of the character stated which includes a receptacle in which the matter to be dispensed may be placed, a measuring cup or chamber, in one position, receiving material from the receptacle, and in another position cutting off the discharge of material from the receptacle but discharging material from the measuring chamber, and a detachable cup into which the material discharged from the measuring chamber is received.

A further object is to provide a structure of this character which is very simple, which may be readily taken apart, which will keep the material being dispensed, as for instance coffee, out of contact with the air, and which will secure a discharge of a measured quantity of material each time that the measuring cup is shifted from its receiving to its discharge position.

Other objects will appear in the course of the following description.

Our invention is illustrated in the accompanying drawings, wherein:—

Figure 1 is a vertical sectional view through a dispensing structure of the character described;

Figure 2 is a fragmentary section in the same plane as Figure 1 and showing the measuring chamber shifted to a discharging position;

Figure 3 is a section through the parts shown in Figure 2 but at right angles to Figure 2;

Figure 4 is a horizontal section on the line 4—4 of Figure 1.

Referring to these drawings, 10 designates a supporting element preferably of metal which is contracted toward its lower end as at 11 and provided with a central screw-threaded opening 12. At one point on the wall of the member 10, there is provided a bracket 13 whereby this member may be attached to a wall or other support. Disposed to engage the lower screw-threaded end of the member 10 is a receiving cup 14. The screw-threads engaging the member 14 of the member 11 are of high pitch so that only one-half turn of the cup 14 fully engages it with the supporting member 11. A gasket 14ᵃ is disposed on the shoulder formed exteriorly of the screw-threads on the neck of the cup 14.

Disposed above the supporting member 11 is a receptacle 15 which may be made of glass, metal or any other suitable material, and it is formed with the inwardly extending flange 16 at its lower end having a downwardly extending screw-threaded portion 17 engaging the screw-threads formed on the upper end of the member 10. If the receptacle 15 is of metal, then a window 18 must be provided through which the contents of the receptacle can be seen so that the necessity of refilling the receptacle can be noted. If the receptacle is of glass, of course, this is not necessary. The receptacle at its upper end is provided with the glass or metal cap 19 which has screw-threaded engagement with the upper end of the receptacle, there being a gasket 20 disposed upon the shoulder of the cap 19 above the screw-threaded portion.

Disposed upon a shoulder 21 formed upon the upper end of the supporting member 10 is a plate 22 of metal, glass or any other suitable material which is held in place upon this shoulder by the downwardly extending annular portion 17 of the flange 16. This plate may constitute the bottom of the receptacle 15 but preferably we provide a false bottom 23 of thin metal or like material which is fitted within the lower portion of the receptacle so as to form a hopper. This false bottom 23 has a central opening and the plate 22 has a central opening designated 24.

Supported by the plate 22 is a passageway or guide shown as rectangular in cross section and designated 25. The bottom of this passageway 26 is closed immediately beneath the opening 24 but this bottom is provided with the opening 27 which is entirely out of alinement or register with the opening 24. Disposed within this guide or passageway is a measuring cup 28 which, as shown, is rectangular in cross section and open at the top and bottom. When this measuring cup is beneath the opening 24, material from the receptacle 15 will flow into and fill the measuring cup. When the measuring cup is moved so as to register with the opening 27, this material in the measuring cup will be discharged into the receiving cup 14.

The measuring cup has attached to it the plate 29 which, when the measuring cup is shifted into alinement with the opening 27, acts as a cut-off for the opening 24 and closes this opening. Depending from the plate 29 is a forked ear 30 and attached to this ear in the fork thereof is a plunger 31 projecting through the wall of the member 11. Springs 32 are attached at their forward ends to the lateral walls of the measuring cup 28 and at their rear ends to ears 33 projecting from the wall of the member 10, these springs 32 acting to retract the measuring cup to the position shown in Figure 1. Obviously when the plunger 31 is pushed in, the cut-off plate 29 will traverse the opening 24, cutting off discharge from the receptacle 15 and the measuring cup 28 will be shifted to a position of registry with the opening 27, discharging a measured amount of material into the receiving cup 14.

It will be seen that the measuring cup 28 may have any desired capacity. For household use, this measuring cup will have a capacity ordinarily of one tablespoon, but for restaurants or under like situations, the whole unit will be made larger to hold a larger amount and the measuring cup may be made larger.

It will be seen that we have provided a canister for measuring predetermined amounts of granular material, such as coffee, tea, flour or the like, which is so designed as to be conveniently used in the kitchen of a home or of restaurants. It is so constructed as to be airtight to thus retain the full flavor of the product being dispensed. The several parts may be readily taken apart for cleansing or for repair in case any is necessary.

While we have illustrated certain details of construction and certain arrangements of parts which we believe to be particularly satisfactory, we do not wish to be limited to these, as obviously many minor changes might be made therein without departing from the spirit of the invention as defined in the appended claims.

We claim:—

1. A dispensing device of the character described, comprising an annular supporting member contracted toward its lower end and provided at its lower end with threads, a receiving cup detachably engaged with the lower end of the supporting member, a receptacle supported upon the supporting member and having screw-threaded engagement at its lower end therewith, a cap for the receptacle, a plate constituting the bottom of the receptacle, the supporting member having an annular shoulder upon which said plate is supported, the plate having a central opening, a guideway extending downward from the plate and having side walls and a bottom, the bottom being closed immediately below the opening through the plate, the bottom of the guideway having a discharge opening out of registry with the opening in the plate, a measuring chamber open at its upper and lower ends and disposed in said guideway and adapted to be shifted in the guideway from a position beneath the central opening of the plate to a position above the discharge opening of the guideway, a cut-off plate attached to the measuring chamber and extending rearward therefrom and fitting against said plate, a plunger extending through the wall of the supporting member and operatively engaged with the cut-off and measuring chamber whereby the measuring chamber may be shifted from its receiving to its discharging positions, and springs urging the measuring chamber to its receiving position.

2. A dispensing device of the character described, comprising an annular supporting member contracted toward its lower end and provided at its lower end with threads, a receiving cup detachably engaged with the lower end of the supporting member, a receptacle supported upon the supporting member and having screw-threaded engagement at its lower end therewith, a cap for the receptacle, a plate constituting the bottom of the receptacle, the supporting member having an annular shoulder upon which said plate is supported, the plate having a central opening, a downwardly and centrally curved false bottom disposed within the receptacle above said plate and having a central opening, a guideway extending downward from the plate and having side walls and a bottom, the bottom being closed immediately below the opening through the plate, the bottom of the guideway having a discharge opening out of registry with the opening in the plate, a measuring chamber open at its upper and lower ends and disposed in said guideway and adapted to be shifted in the guideway from a position beneath the central opening of the plate to a position above the discharge opening of the guideway, a cut-off plate attached to the measuring chamber and extending rearward therefrom and fitting against said plate, a plunger extending through the wall of the supporting member and operatively engaged with the cut-off and measuring chamber whereby the measuring chamber may be shifted from its receiving to its discharging positions, and springs urging the measuring chamber to its receiving position.

3. A dispensing device of the character described, comprising an annular supporting member, interiorly screw-threaded at its upper end and formed just below its upper end with an annular shoulder, a receiving cup detachably engaged with the lower end of the supporting member, a receptacle disposed upon the supporting member and having an inwardly extending flange formed with a downwardly extending screw-threaded portion engaging the screw-threads on the upper end of the supporting member and affording air-tight engagement between the receptacle and the supporting member, a cap for the receptacle, a plate resting upon the shoulder of the supporting member and held in place by the lower end of the receptacle, said plate having a central opening, a guideway formed below the plate and having side walls and a bottom, the bottom being closed immediately below the opening of the plate and having a discharge opening out of registry with the opening of the plate, a measuring chamber slidable in said guideway and open at its upper and lower ends, and means for shifting said measuring chamber from a position of registry with the central opening of the plate to a position of registry with the discharge opening of the guideway, the measuring chamber having a cut-off plate extending rearward therefrom and fitting against the first named plate.

ALEXANDER MOSCHETTI.
SALVATORE BIAZZI.